United States Patent [19]
Adorney et al.

[11] 3,820,133
[45] June 25, 1974

[54] TEACHING DEVICE
[76] Inventors: Charles S. Adorney, 61 Mallard Dr.;
William H. Davis, 88 W. Brother Dr., Greenwich, both of Conn. 06830
[22] Filed: July 24, 1972
[21] Appl. No.: 274,465

[52] U.S. Cl. ............ 354/60, 95/14, 35/29 A, 273/186 R, 352/121
[51] Int. Cl. ............... G03b 19/02, A63b 69/36
[58] Field of Search .......... 95/11 R, 36 R, 13, 14, 95/82, 83; 35/29 A; 346/107 R; 352/121, 84, 39; 273/186 R

[56] References Cited
UNITED STATES PATENTS

| | | | |
|---|---|---|---|
| 1,853,995 | 4/1932 | Piraino | 95/14 X |
| 2,192,755 | 3/1940 | Rabkin et al. | 95/14 |
| 3,016,812 | 1/1962 | Chatlain | 95/11 |
| 3,173,348 | 3/1965 | Betinis | 352/84 X |
| 3,202,069 | 8/1965 | Cummins et al. | 95/36 R |
| 3,398,664 | 8/1968 | Bonatsos | 95/14 |
| 3,408,750 | 11/1968 | McCollough et al. | 35/29 A |

*Primary Examiner*—Robert P. Greiner
*Attorney, Agent, or Firm*—Fitzpatrick, Cella, Harper & Scinto

[57] ABSTRACT

A teaching device for making a permanent record of the movement of a participant in action, which includes a stall having a front instrument panel, a camera mounted on the instrument panel directly in front of the participant, a plurality of electric eyes, mounted on the instrument panel at preselected spaced locations, being actuatable by the movement of the participant, and an electrical control circuit for sequentially actuating the shutter of the camera responsive to actuation by the electric eyes.

5 Claims, 3 Drawing Figures

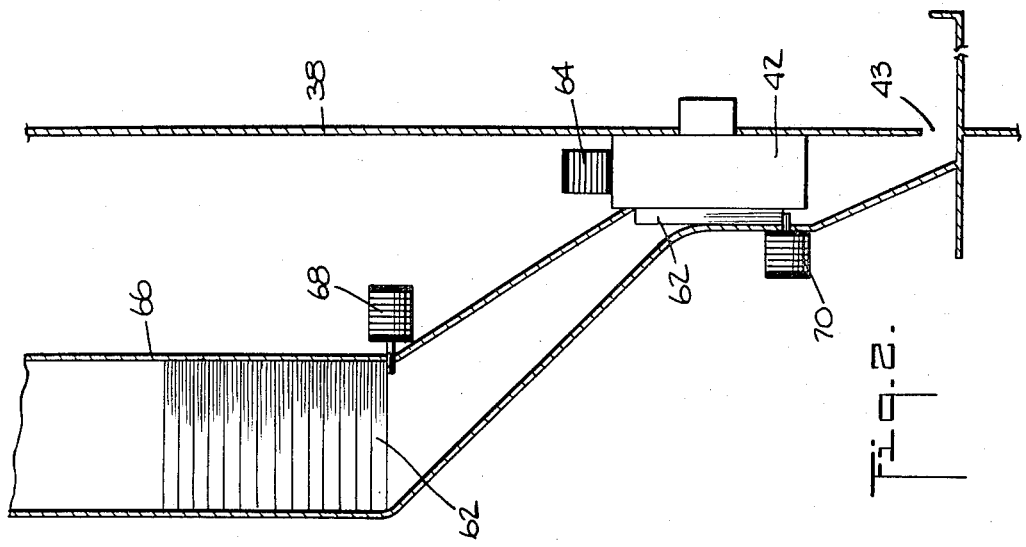
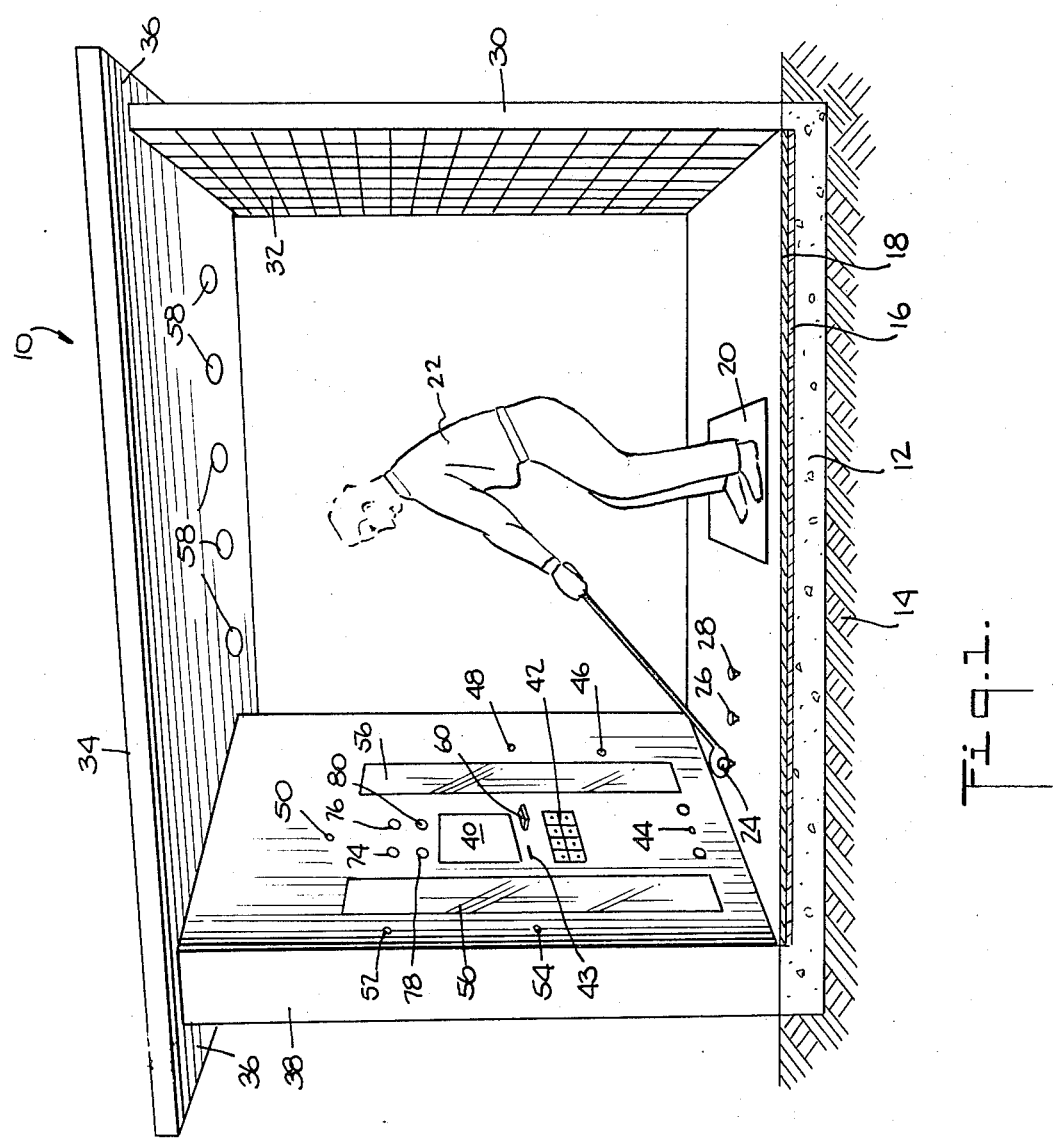

TEACHING DEVICE

This invention relates to teaching devices and more particularly to a device for analyzing physical movement. It is adopted, among other possible applications, for use in improving a participant's skill in many activities such as sports and games, and it is particularly applicable to golf.

In most high-participation sports, such as golf, tennis, angling and bowling, for example, the inability of a player to see his own actions or "form" is a prime factor in limiting his performance. Historically, the player has had to rely on "feel" for self-analysis. "Feel," in this respect, may be defined as the mental impression or picture of muscular movement. However, "feel" has been found to be an unreliable analytical tool. In golf, for example, it frequently has been proven, by photographic means, that the best players do not do physically what they "feel" or think they do mentally; and that they do things physically that they do not "feel" or think they do mentally. Even when a golfer receives direct instructions from a professional teacher, the inability of the player to actually see his own performance frequently militates to slow down and limit his improvement.

Attempts have been made to overcome this problem by the use of film, video equipment, and instant-development photography. Many efforts have been made, since the advent of photography, to devise systems for producing such images, such as "still" photographs, cine photographs, sequence photographs and video tape, for example. However, all of these systems have certain disadvantages such as complexity and high costs, for example. The sequence photography utilized heretofore operated on a timing cycle and, hence, did not produce pictures of preselected segments of the movement.

The present invention involves a novel combination of features combined in such a way as to afford a very efficient solution to the difficulties encountered with the prior art, as will become apparent as the description proceeds.

In view of the foregoing, our invention contemplates, when adapted for golf, the provision of a new and improved teaching device for making a permanent record of the movement of a participant in action characterized by a stall having a front instrument panel. A camera is mounted on the instrument panel directly in front of the participant and a plurality of electric eyes are also mounted on the instrument panel at preselected spaced locations. The electric eyes are actuated by the movement or swing of the participant. Lighting means are provided for illuminating the participant and an electrical control circuit is provided for sequentially actuating the shutter of the camera responsive to actuation by the electric eyes to produce a sequence record of the movement.

There has thus been outlined rather broadly the more important features of the invention in order that the detailed description thereof that follows may be better understood and in order that the present contribution to the art may be better appreciated. There are, of course, additional features of the invention that will be described more fully hereinafter. Those skilled in the art will appreciate that the conception on which this disclosure is based may readily be utilized as the basis for the designing of other structures for carrying out the several purposes of the invention. It is important, therefore, that this disclosure be regarded as including such equivalent constructions as do not depart from the spirit and scope of the invention.

One embodiment of the invention has been chosen for purposes of illustration and description, and is shown in the accompanying drawings, forming a part of the specification, wherein:

FIG. 1 is a perspective view of a teaching device constructed in accordance with the concepts of our invention;

FIG. 2 is an enlarged, vertical, sectional view showing details of the photographic element of our invention.

Figure 3:
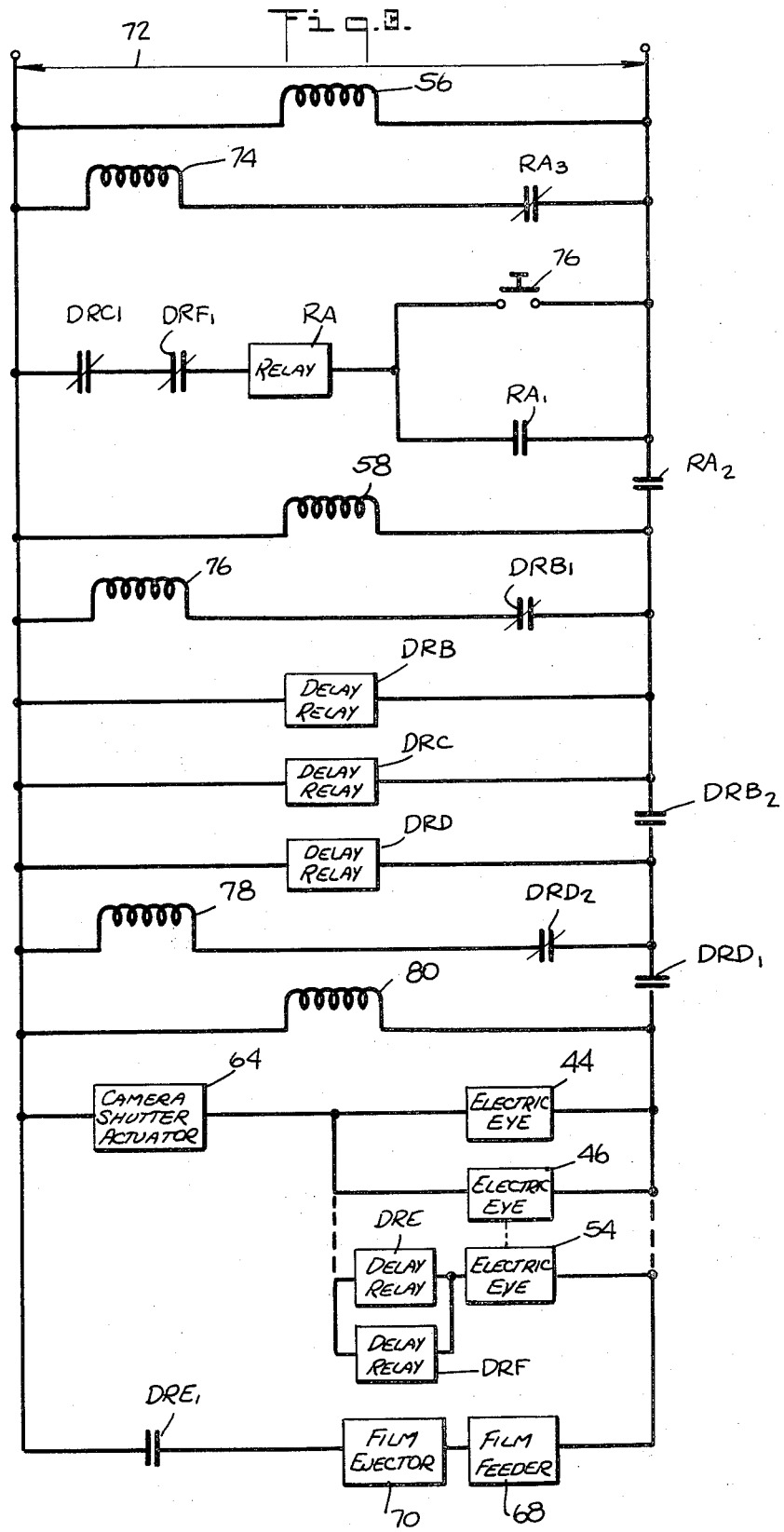
FIG. 3 is a combined block and schematic diagram of an electrical control circuit constructed in accordance with the principles of the invention.

In the illustrated embodiment of the invention, a stall, indicated generally at 10, FIG. 1, of about the size of a golf driving range stall, includes a floor of any suitable material such as a poured or pre-cast slab 12 of concrete, for example, resting on the ground 14. The slab carries a pad or cushion 16 which is of suitable material for withstanding a golfer's spikes, and thereover is a layer or cover 18 of suitable material such as artificial turf or an outdoor all-weather rug. A small area 20 upon which the golfer 22 stands is readily replaceable. A plurality of tees 24, 26 and 28 are set in the artificial turf 18. A back wall 30 is provided having a dark or matte black inside surface with grids 32 thereon, the grids are formed of white lines, which are from about 9 to about 12 inches in length in order to give the golfer an indication of the degree of "sway" or "bobbing" during a swing. That is, the grids enable the golfer to relate his position to various points in the swing to the position known to be correct. In addition, the stall include a weather-proof roof 34 having overhangs 36.

There is a front wall or instrument panel 38 carrying on instruction panel 40, which explains to the golfer how to operate the system. A camera 42 is mounted on the instrument panel 38 directly in front of the golfer 22 when he is addressing the ball. A slot 43 is disposed adjacent the cameras for delivering the finished photograph. Electric eyes or photoelectric devices 44, 46, 48, 50, 52 and 54 are mounted on the instrument panel at preselected spaced locations, determined by the desired segments of the swing which are to be photographed. Means, not shown, located behind the golfer to provide light to said electric eyes which would be interrupted by the golfer's swing.

Still referring to FIG. 1, frontal lights 56 are mounted on instrument panel 38, and ceiling lights 58 are mounted on the roof 34. The frontal lights provide a "soft" lighting effect, whereas the ceiling lights are of the flood type, directed at the golfer from head to foot. The ceiling lights have about twice the intensity of the frontal lights to provide greater definition and form of the human body. A coin operated mechanism 60 is provided on the instrument panel 38, which upon receiving suitable monies actuates the camera, the lights and the electric eyes, as will be discussed more fully hereinafter. The side of the stall to the left of the right handed golfer 22, as he addresses the ball, is open; and a partial wall may be provided on the side of the stall to the right of the right handed golfer 22, if desired. However, such a partial wall should contain a door or be of such a height that entry into the stall by the golfer is easy and comfortable.

Referring to FIG. 2, the camera 42 is of any suitable type such as a GRAPH-CHECK camera, as manufactured by Photogrammetry, Inc., of Rockville, Maryland which is adapted to receive self-developing film of the Polaroid type. This camera produces a sequence of about eight separate fixed focus photographs on one film sheet 62. Of course, other types of cameras may be employed, such as a single picture type capable of making superimposed sequence picture on the film sheet 62. High speed film is used in order to stop the motion of the golfer, in action. After each sequence has been exposed, the film sheet 62 is ejected from the camera 42 in the manner described hereinafter. The camera 42 is provided with a solenoid controlled shutter actuator 64, which is actuated by each of the electric eyes 44 to 54; to take the desired sequence of photographs on the film sheet 62. The film sheets 62 are fed one by one from a supply magazine 66 by a solenoid controlled film feeder 68, which operates simultaneously with a solenoid controlled film ejector 70. The lens of the camera is of wide angle in order to include the largest possible golfer.

Referring now to FIG. 3, there is illustrated an electrical control circuit constructed in accordance with the principles of the invention. The circuit illustrated comprises any suitable source 72 of AC current for energizing the same, and the frontal lights 56 are connected across the source. A standby light indicator 74 is connected in series with a normally closed relay controlled switch $RA_3$. Thus, when the golfer first enters the stall, the frontal lights 56 and the standby light 74 are illuminated. The golfer consults the instruction panel 40, FIG. 1, and then selects the tee 24, 26, 28 that corresponds to his height, in order to obtain the largest possible image. For example, if the player is relatively short, he would select tee 24, which is closest to the camera. The money operated mechanism 60, FIG. 1, of any suitable type that will operate a switch 76, FIG. 3, upon insertion of predetermined monies. Mounted in parallel with the switch 76 is a normally opened relay controlled switch $RA_1$ and in series with the switch 76 and the relay controlled switch $RA_1$ is a relay RA, a normally closed relay controlled switch $DRF_1$ and normally closed relay controlled switch $DRC_1$. A normally opened relay controlled switch $RA_2$ serves to control the power supply to the remainder of the circuit. Upon insertion of the predetermined monies, the normally opened switch 76 closes the circuit containing the relay RA which then closes switch $RA_1$ and $RA_2$ while opening switch $RA_3$. This turns off the standby light indicator 74, illuminates ceiling lights 58 and illuminates a warm-up light indicator 76, FIGS. 1 and 3, which is connected in series with a normally closed relay operated switch $DRB_1$. Closure of the switch $RA_2$ also energizes a time delay relay DRB and a time delay relay DRC. Any suitable type of time delay relay may be employed such as the time delay relay circuit described on page 320 et. seq. in the General Electric Company's Transistor Manual, Seventh Edition, dated 1964. These relays are designed to operate a switch after a preselected time delay, commencing from when they are initially energized. The DRB time delay relay is set for a time delay of about four minutes and 50 seconds in order to provide time for the golfer to warm-up. The DRC time delay relay is set for a delay of about seven minutes so that if the golfer fails to take a swing within seven minutes it will open the normally closed relay operated switch $DRC_1$ which opens the circuit, thereby resetting the system for the next golfer. After four minutes and 50 seconds have elapsed, the delay relay DRB closes a normally open relay operated switch $DRB_2$ which closes a circuit containing a time delay relay DRD and also closes a parallel circuit containing a get-ready indicator 78 and a normally closed relay controlled switch $DRD_2$, so that the indicator 78 is actuated. The indicator 78 may be a red light or a buzzer, for example. The time delay relay DRD is of the same type as the time-delay relay DRB and DRC, described hereinbefore. The time delay relay DRD is set for about 10 seconds so that the golfer can make sure his ball is placed on the tee and be ready to take his swing for the phototaking process. After ten seconds have elapsed the time delay relay, DRD opens the relay operated switch $DRD_2$ to turn off the indicator 78 and to close a normally open relay operated switch $DRD_1$, which closes a circuit containing a recording indicator 80, which indicates to the golfer that he should not take his swing. Connected in parallel with the recording indicator 80 is the shutter actuator 64, which is connected in series with each of the electric eyes 44 to 54. During the golfer's swing as the club passes in front of the electric eyes, respectively, the circuit is repeatedly closed to actuate the camera shutter actuator 64, thereby exposing the film in such a way as to photorecord each strategic segment of the golfer's swing. That is, as the golfer swings, the camera is triggered by the electric eyes, to take a sequence of photographs of various segments from the start of the back swing to the completion of the follow-through. Because the electric eyes are set in predetermined locations, all repetitive sequences will be taken at exactly the same segment in the swing, regardless of the speed of any particular swing. This allows direct comparison from one sequence of photographs to another, regardless of whether or not they are of the same person. In addition, the golfer may in this manner compare his stroke with that of his favorite professional. Any suitable type of electric eye may be employed such as the light interruption detector described in section 13.3.5 in the General Electric Company's SCR Manual, 4th edition, dated 1967.

Still referring to FIG. 3, time delay relays DRE and DRF are connected in parallel with each other and in series with the last electric eye 54. These time delay relays are of the same type as the time delay relays DRB and DRC, described hereinbefore. The time delay relay DRE is set for about 10 seconds, so that 10 seconds after the last electric eye 54 triggers the camera shutter actuator 64 to expose the last picture, the time delay relay DRE closes a normally open relay operated switch $DRE_1$ to close a circuit containing the solenoid controlled film ejector 70, which removes the completely processed film from the camera and deposits it in the slot 43 (FIGS. 1 and 2) and, simultaneously, the solenoid controlled film feeder 68 (FIGS. 2 and 3) feeds a new sheet of film from the magazine 66 (FIGS. 2) into the camera, in position for the next sequence of photographs. The time delay relay DRF is set for about 20 seconds so that after 20 seconds have elapsed, the time delay relay DRF opens the normally closed relay operated switch $DRF_1$, which opens the switch containing the relay RA, thereby opening the switches $RA_1$ and $RA_2$ while closing the switch $RA_3$, whereby the entire system is returned to its initial position, ready for the next cycle of operation to commence. Repeated cycles of operation function in the same manner as that just described.

It will thus be seen that the present invention provides an improved teaching device which makes a permanent record of the movement of a participant in action for interest, amusement, self-evaluation, self-analysis, self-improvement or for use by a teacher giving formal instruction; and which provides a permanent record of the movement of the participant in action for direct and exact comparison with the form of an outstanding performer in the field.

Although a particular embodiment of the invention is herein disclosed for purposes of explanation, various modifications thereof, after study of the specification, will be apparent to those skilled in the art to which the invention pertains.

What is claimed and desired to be secured by Letters Patent is:

1. A device for making a sequence of photographs forming a permanent record of the movement of a participant in action comprising a stall, said stall having a back wall having visible grids disposed thereon, said stall having a roof and a front wall instrument panel, lighting means for illuminating the interior of said stall, a camera mounted on said instrument panel directly in front of the position where said participant is to be in action, a plurality of electric eyes mounted on the instrument panel at preselected spaced locations, an electrical system for sequentially actuating the shutter of said camera responsive to actuation by said electric eyes actuated during a single stroke by said participant, means for initiating actuation of said electrical system by said participant, means for feeding of a new sheet of film from a magazine to the camera in position for the next sequence of photographs, means for recycling said electrical system to its initial position when a participant fails to act after a preselected time delay, and means for recycling said electrical system to its initial position after a preselected time delay after the actuation of the last electric eye.

2. A device for making a permanent record of the movement of a participant in action according to claim 1 wherein said back wall having visible grids disposed thereon comprises a back wall having a matte black inside surface with grids of white lines disposed thereon.

3. A device for making a permanent record of said movement of a participant in action according to claim 1 wherein said lighting means for illuminating the interior of said stall comprises frontal lights mounted on said instrument panel and ceiling lights mounted on said roof.

4. A device for making a permanent record of the movement of a participant in action according to claim 1 wherein said electrical system comprises a standby light indicator mounted on said instrument panel, a warm-up light indicator mounted on said instrument panel, a get-ready indicator mounted on said instrument panel, a recording indicator mounted on said instrument panel, means for sequentially actuating said standby light indicator, said warm-up light indicator, said get-ready indicator and said recording indicator.

5. A golfing device for making a sequence of photographs forming a permanent record of the movement of a participant in action comprising a stall, said stall having a back wall having a matte black inside surface with grids of white lines disposed thereon, said stall having a weather-proof roof and a front wall instrument panel, a camera mounted on said instrument panel directly in front of the position where said participant is to be in action, a plurality of electric eyes mounted on the instrument panel at preselected spaced locations, frontal lights mounted on said instrument panel, ceiling lights mounted on said roof, a standby light indicator mounted on said instrument panel, a warm-up light indicator mounted on said instrument panel, a get-ready indicator mounted on said instrument panel and a recording indicator mounted on said instrument panel, an electrical system including means for energizing said ceiling lights and said standby light indicator, means for de-energizing said standby light indicator and for energizing said warm-up light indicator for a preselected duration of time, means for de-energizing said warm-up light indicator and for energizing said get-ready indicator for a preselected duration of time, means for de-energizing said get ready indicator and for energizing said recording indicator, means for sequentially actuating the shutter of said camera responsive to actuation by each said electric eyes actuated during a single stroke by said participant, means for ejecting a completely processed film from said camera and depositing it in a slot on said instrument panel, means for feeding a new sheet of film from a magazine to the camera in position for the next sequence of photographs, means for recycling said electrical system to its initial position when a participant fails to act after a preselected time delay after the actuation of the last electric eye.

* * * * *